Patented June 15, 1926

1,589,303

UNITED STATES PATENT OFFICE.

HEINRICH NERESHEIMER, OF LUDWIGSHAFEN-ON-THE-RHINE, GERMANY, ASSIGNOR TO BADISCHE ANILIN- & SODA-FABRIK, OF LUDWIGSHAFEN-ON-THE-RHINE, GERMANY, A CORPORATION OF GERMANY.

VAT COLORING MATTER.

No Drawing. Application filed April 26, 1923, Serial No. 634,858, and in Germany August 16, 1922.

This invention relates to a violet vat coloring matter belonging to the dibenzanthrone class which is distinguished by producing a brilliant shade with a strong reddish cast as could not hitherto be obtained with a derivative of this group.

It is known that dibenzanthrone which can be obtained by the alkaline condensation of benzanthrone can be converted into a coloring matter producing brighter shades by treating with halogen, but I have found that halogen derivatives of dibenzanthrone coloring matter can be obtained in a new form in which they produce dyeings with extraordinary brilliancy and reddish hue by chlorinating the dibenzanthrone coloring matter while using chloro-sulfonic acid as a solvent or diluting agent. The new chlorinated dibenzanthrone gives dyeings very similar to the decidedly reddish violet brilliant shades produced by chlorinated isodibenzanthrone. Mixtures of chloro-sulfonic acid and other diluting means may also be employed as well as catalysts.

The following examples will serve to illustrate one mode of obtaining the new product but the invention is not limited to this or any other process for manufacturing the product. The parts are by weight:

Example 1.

Dibenzanthrone is dissolved in 10 times its weight of chloro-sulfonic acid and chlorine is passed into the solution while maintaining a temperature of about 0 degree to 10 degrees centigrade until the dyestuff left behind from a test portion of the reaction mass on diluting with water and filtering is soluble in alkaline hydrosulfite solution with a greenish-blue color. The dyestuff is then worked up in the usual way and represents a dark-violet powder. It is difficultly soluble in solvents of low boiling point and more soluble in high boiling solvents; with concentrated sulfuric acid a crimson colored solution is obtained. It dyes cotton violet shades with rather a strong reddish cast such as cannot be produced with the dibenzanthrone coloring matters so far known. The same characteristic property appears also when the dyestuff is used in the form of a pigment for printed wall paper. It especially differs in this respect from the chlorinated dibenzanthrones prepared by the action of chlorine or sulfuryl-chlorid in dilution with nitrobenzene which, so far known, are decidedly bluish violet or nearly blue dyestuffs. These latter dyestuffs differ also in dissolving in concentrated sulfuric acid with a bluish violet coloration instead of crimson.

Example 2.

10 parts of dibenzanthrone and 0.25 parts of anhydrous ferric chlorid are dissolved in a mixture of 50 parts of chloro-sulfonic acid and 50 parts of monohydratic sulfuric acid and chlorine is then passed into the solution thus obtained at about 20 degrees centigrade until a test shows that the product forms a pure blue hydrosulfite vat. Apart from the slight difference in the color of the hydrosulfite vat the properties of the dyestuff thus obtained are substantially identical with those of the aforedescribed product.

What I claim is:

1. As a new article of manufacture, chlorinated dibenzanthrone, as obtained by chlorinating dibenzanthrone in the presence of chloro-sulfonic acid, which is soluble in concentrated sulfuric acid with a crimson color and which when dyed from a hydrosulfite vat or when applied as a pigment for printing paper, produces violet shades with a more reddish cast than those produced with the known chlorinated dibenzanthrone obtained with chlorine or sulfuryl chlorid in nitrobenzene solution.

2. The process of producing chlorinated dibenzanthrone which produces violet dyeings with an extraordinary red cast which consists in chlorinating dibenzanthrone in the presence of chloro-sulfonic acid.

In testimony whereof I have hereunto set my hand.

HEINRICH NERESHEIMER.